H. C. ECKENROAD.
BICYCLE OR MOTOR CYCLE SADDLE CLAMP.
APPLICATION FILED FEB. 26, 1915.

1,147,007.

Patented July 20, 1915.

Witnesses
J. Frederic Cherry
John S. Richey

Inventor
Harvey C. Eckenroad
By F. O. Richey
His Atty.

UNITED STATES PATENT OFFICE.

HARVEY C. ECKENROAD, OF ELYRIA, OHIO, ASSIGNOR TO THE SUPERIOR METAL PRODUCTS COMPANY, OF ELYRIA, OHIO, A CORPORATION OF OHIO.

BICYCLE OR MOTOR-CYCLE SADDLE-CLAMP.

1,147,007. Specification of Letters Patent. Patented July 20, 1915.

Application filed February 26, 1915. Serial No. 10,679.

*To all whom it may concern:*

Be it known that I, HARVEY C. ECKENROAD, a citizen of the United States, residing at Elyria, in the county of Lorain and State of Ohio, have invented certain new and useful Improvements in Bicycle or Motor-Cycle Saddle-Clamps; and I do hereby declare the following to be a full, clear, and exact description of the invention, such as will enable others skilled in the art to which it appertains to make and use the same.

My invention relates to bicycle or motor-cycle saddle clamps or the means for securing the bicycle or motorcycle saddle to the saddle post.

The principal object of my invention is to provide means for connecting the saddle to the post, which can be conveniently and cheaply made and which will be more effective in performing the functions required of it than the clamps hitherto in use.

Another object of my invention is to reduce the number of parts required in devices hitherto in use for this purpose.

So far as I am aware, devices of the kind with which mine are classed have hitherto either been made of forgings or castings, which have had to be machined, all of which are very expensive, or else when made of sheet metal, have not been provided with means for securely gripping the post and retaining the saddle in position in rough usage.

By my invention I am enabled to make the essential parts of sheet metal and to stamp out the same. The parts are so made that the saddle will be firmly clamped to the post and there will be no danger of its shifting from its position in rough usage.

These and other objects of my invention will be perhaps better understood from a description of an embodiment of the invention.

Figure 1:
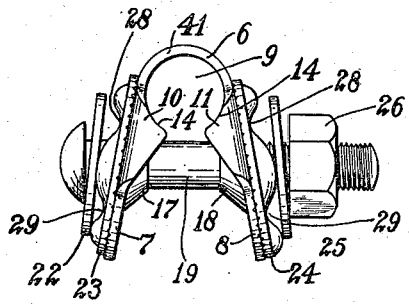
Figure 2:
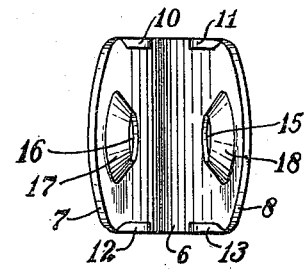
Figure 3:
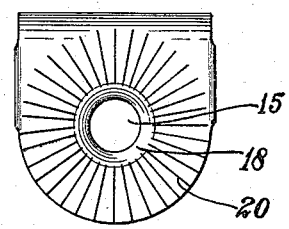
Figure 4:
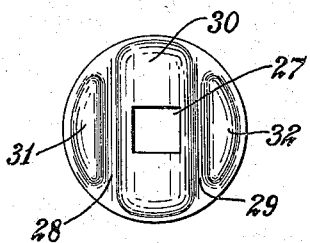
Figure 5:
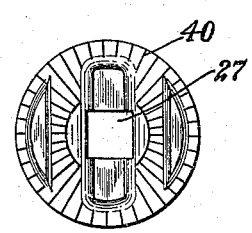

Figure 1 shows a front elevation of an embodiment of my invention. Fig. 2 is a plan view of the portion which immediately engages the saddle post and which will here be called for convenience the clip. The other parts have been removed from the clip, as illustrated in Fig. 2. Fig. 3 is a side elevation of the clip. Fig. 4 is a side elevation of the member interposed between the saddle rods or frame members and the clip. Fig. 5 is an elevation of the figure shown in Fig. 4, illustrating the opposite side of this member from that shown in Fig. 4.

Referring now to the embodiment illustrated in the drawing, at 6 is shown the clip which is made from sheet metal, preferably by stamping out the same. This member is formed in the shape of a loop with wings 7 and 8 which are preferably inclined toward each other, forming a pocket 9 shaped suitable to the saddle post which is to be gripped. When the blank for the member 6 is cut out, pieces are left upon the ends thereof to form the lips 10, 11, 12 and 13. These lips are integral with the clip and have their upper ends curved away, as shown at 14, of substantially the same curvature as the post to be gripped. These members are turned in at a suitable angle, preferably at right angles to the main direction of the wings 7 and 8, thus forming a bearing for the saddle post which firmly grips the same when the wings 7 and 8 are tightened down. The wings 7 and 8 are perforated, as shown at 15 and 16, for a purpose to be described, and these perforations are counter-sunk, as shown at 17 and 18, to form a bearing for the bolt 19, which is passed through these perforations. The outer surfaces of the wings 7 and 8 are provided with a number of radial grooves 20, as illustrated in Fig. 3. These grooves, if extended, would center at the center of the opening 15.

Means are provided for connecting the saddle to the clip, here consisting of members 22, 23, 24, 25 and the bolt 19 and nut 26. The members 23 and 24 are alike, both consisting of punchings of sheet metal, preferably disk shaped, as illustrated in Figs. 4 and 5. Each is provided with an opening 27 near the center thereof, through which the bolt 19 passes, as illustrated in Fig. 1. Grooves 28 and 29 are formed in the outside surface of these members by punching out the sheet metal to form a central projection 30 and side projections 31 and 32, which are here shown as ridges. The inside of these members is provided with a plurality of grooves 40, which, as illustrated in Fig. 1, engage with the grooves 20 on the outside of the wings 7 and 8. The members 22 and 25 may be simply an ordinary form of washer.

The apparatus is shown assembled in Fig.

1, with the members 23 and 24 next to the wings 7 and 8 and the washers on the outside of the members 23 and 24. When it is desired to mount the saddle upon the post, the frame rods or other parts of the saddle are placed in the grooves 28 and 29 and the post slipped through the pocket 9. The nut 26 is then drawn down, which causes the members 22, 23, 24 and 25 to grip the portions of the saddle frame in the grooves 28 and 29, and which forces together the wings 7 and 8 until the post is firmly gripped between the portion 41 of the clip and the ridges 10, 11, 12 and 13. The bolt will rest upon the bearings 17 and 18. Owing to the resiliency of the sheet metal from which the clip is made, the same being thus compressed, will always tend to expand, thereby holding the parts firmly together, and preventing their being jarred or shaken loose. I have illustrated this particular embodiment of my invention for the purpose of better describing the same. I do not wish to be limited to the particular details shown, as it will be appreciated that departures may be made both from the form and details, without departing from the scope of the invention.

I claim:

1. In a bicycle saddle clamp, the combination of an integral sheet metal clip having a pair of open wings and a pocket between the wings for the saddle post, lips integral with said wings turned in at right angles thereto forming saddle post engaging members to engage with their edges the top of the saddle post, and means to clamp the clip to the saddle post.

2. In a bicycle saddle clamp, the combination of an integral sheet metal clip having a pair of perforated open wings, a pocket for the post formed between the wings, a plurality of lips integral with said wings on said wings adjacent said pocket, said lips being turned in substantially at right angles to the surface of the wings and adapted to engage with their edges the saddle post, a pair of saddle engaging members and a bolt passed through the perforations in said wings for drawing the saddle engaging members together and causing the clip to grip the post in the pocket between the lips when the saddle is mounted upon the post.

3. In a bicycle saddle clamp, the combination of an integral sheet metal clip having a pair of open wings and a pocket between the wings for the saddle post, lips upon the wings formed by turning in the edge thereof, said lips adapted to engage with their edges the saddle post when the clip is mounted upon the post, said wings being perforated, saddle engaging members and a bolt and nut for connecting said saddle engaging members to the clip, said wings being drawn together when the nut is drawn down upon the bolt to firmly grip the post and hold the parts together.

4. In a bicycle saddle clamp, the combination of a clip made of an integral piece of sheet metal and having a pair of open wings and a pocket for the saddle post, four lips on said clip formed from sheet metal and turned in substantially at right angles to the wings to engage with their edges the saddle post and confine it within said pocket, said wings being perforated and the edges of the perforations being counter-sunk to form bearings, the outside edges of the wings being grooved, a pair of saddle engaging members having grooves and ridges upon one side to coöperate with the grooves upon the wings of the clip, projections formed upon the other side of said saddle engaging members by punching out the material thereof forming grooves between said projections for the saddle rods, washers for engaging the other side of the rods, said washers and saddle engaging members being perforated, a bolt extending through the perforations in the clip wings, the saddle engaging members and the washers and a nut on said bolt, the clip being made of resilient material and its wings being drawn together when the nut is forced down, and by its resiliency firmly holding the various parts together.

5. In a bicycle saddle clamp, the combination of a clip made of resilient sheet metal, said clip provided with a pair of open wings and a pocket, lips integral with said wings formed by turning in projections which have been formed upon said wings, said lips adapted to engage with their edges the saddle post and confine it to the pocket, said wings being perforated and bearings formed in said perforations by counter-sinking the edges thereof, and means to connect said clip to a bicycle saddle.

6. In a bicycle saddle clamp, the combination of a clip made of sheet metal provided with a pair of open wings and a pocket for the saddle post, a plurality of lips integral with the clip and formed by turning in projections on said clip, said lips being substantially at right angles to the wings and confining the saddle post to the pocket, said wings being perforated, means to connect the saddle to the clip and means to draw said wings together to tightly grip the saddle post.

7. In a bicycle saddle clamp, the combination of an integral sheet metal clip having a pair of open wings and a pocket between the wings for the saddle post, lips integral with said wings turned in at right angles thereto forming saddle post engaging members to engage with their edges the top of the saddle post, the edges of the lips next to the post being curved to fit the saddle post, and means to clamp the clip to the saddle post.

8. In a bicycle saddle clamp, the combination of an integral sheet metal clip having a pair of open perforated wings, a pocket for the post formed between the wings, a plurality of lips integral with said wings on said wings adjacent said pocket, said lips being turned in substantially at right angles to the surface of the wings and adapted to engage with their edges the saddle post, the edges of the lips next to the post being curved to fit the curvature of the saddle post, a pair of saddle engaging members and a bolt passed through the perforations in said wings for drawing the saddle engaging members together and causing the clip to grip the post in the pocket between the lips when the saddle is mounted upon the post.

9. In a bicycle saddle clamp, the combination of a clip made of an integral piece of sheet metal and having a pair of open wings and a pocket between the wings and saddle post, four lips on said clip formed from the sheet metal and turned in substantially at right angles to the wings to engage with their edges the saddle post and confine it within said pocket, each wing being provided with two lips, the lips on the wings being opposite each other and the edges thereof facing the saddle post being curved to fit the curvature of the saddle post, said wings being perforated and the edges of the perforations being counter-sunk to form bearings, the outside edges of the wings being grooved, a pair of saddle engaging members having grooves and ridges upon one side to coöperate with the grooves upon the wings of the clip, projections formed upon the other side of said saddle engaging members by punching out the material thereof forming grooves between said projections for the saddle rods, washers for engaging the other side of the rods, said washers and saddle engaging members being perforated, a bolt extending through the perforations in the clip wings, the saddle engaging members and the washers and a nut on said bolt, the clip being made of resilient material and its wings being drawn together when the nut is forced down and by its resiliency firmly holding the various parts together.

In testimony whereof, I have signed my name in the presence of two witnesses, this 22 day of February, 1915.

HARVEY C. ECKENROAD.

Witnesses:
JOHN S. RICHEY,
F. O. RICHEY.

Copies of this patent may be obtained for five cents each, by addressing the "Commissioner of Patents, Washington, D. C."